US012598187B2

(12) United States Patent
Al-Essa et al.

(10) Patent No.: US 12,598,187 B2
(45) Date of Patent: Apr. 7, 2026

(54) SYSTEM AND METHOD FOR MANAGING PRIVILEGED ACCOUNT ACCESS

(71) Applicant: SAUDI ARABIAN OIL COMPANY, Dhahran (SA)

(72) Inventors: Abdullah T. Al-Essa, Dammam (SA); Khalid H. Qahtani, Dammam (SA); Taher A. Alwusaibie, Al-Hofuf (SA); Anthony Graham Murdoch, Dhahran (SA); Tariq S. Alshlash, Dhahran (SA); Osamah A. Bugeaey, Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 449 days.

(21) Appl. No.: 17/821,085

(22) Filed: Aug. 19, 2022

(65) Prior Publication Data

US 2024/0064148 A1 Feb. 22, 2024

(51) Int. Cl.
*H04L 9/40* (2022.01)
*H04L 9/08* (2006.01)
(52) U.S. Cl.
CPC .......... *H04L 63/102* (2013.01); *H04L 9/0869* (2013.01); *H04L 63/067* (2013.01)
(58) Field of Classification Search
CPC ... H04L 63/102; H04L 9/0869; H04L 63/067; H04L 9/3228; H04L 63/0838
See application file for complete search history.

(56) References Cited

U.S. PATENT DOCUMENTS

| | | | | |
|---|---|---|---|---|
| 9,529,993 B2 * | 12/2016 | Kapadia | .................. | G06F 21/40 |
| 2002/0010768 A1 * | 1/2002 | Marks | ................. | G06F 21/6218 |
| | | | | 709/227 |
| 2002/0112186 A1 * | 8/2002 | Ford | .................... | H04L 63/105 |
| | | | | 726/7 |

(Continued)

FOREIGN PATENT DOCUMENTS

| | | | | | |
|---|---|---|---|---|---|
| CA | 2954763 C | * | 5/2019 | ............... | G07C 9/20 |
| DE | 102004047146 A1 | * | 3/2006 | ......... | G06F 12/1458 |
| WO | WO-2019197491 A1 | * | 10/2019 | ............. | G06F 21/88 |

OTHER PUBLICATIONS

Written Opinion and International Search Report from corresponding PCT Application No. PCT/US2024/011774 mailed Apr. 24, 2024.

(Continued)

*Primary Examiner* — John B King
(74) *Attorney, Agent, or Firm* — Vorys, Sater, Seymour and Pease LLP

(57) ABSTRACT

A system and method is described that reduces a likelihood that a privileged account at a system (e.g., device, network, and/or application) for a user is compromised. For example, the privileged account for the user at the system is disabled in response to being created. The user can provide a request for at least one elevated right at the system corresponding to a request to use the privileged account at the system. An identity of the user is authenticated in response to receiving the request to confirm that the user is requesting the privileged account at the system. The privileged account for the (Continued)

300 —◄ user is enabled at the system to allow the user to perform at least one action that the user was not previously allowed to perform.

18 Claims, 4 Drawing Sheets

(56) References Cited

U.S. PATENT DOCUMENTS

| | | | | |
|---|---|---|---|---|
| 2006/0143447 | A1 * | 6/2006 | Vasishth | H04L 63/102 |
| | | | | 713/166 |
| 2006/0143685 | A1 * | 6/2006 | Vasishth | G06F 21/62 |
| | | | | 726/1 |
| 2006/0155716 | A1 * | 7/2006 | Vasishth | G06Q 10/06 |
| 2006/0224890 | A1 * | 10/2006 | Zhou | H04L 63/0876 |
| | | | | 713/172 |
| 2010/0257596 | A1 * | 10/2010 | Ngo | H04L 63/08 |
| | | | | 726/7 |
| 2011/0239275 | A1 * | 9/2011 | De Peuter | H04L 63/20 |
| | | | | 726/4 |
| 2013/0139222 | A1 * | 5/2013 | Kirillin | H04L 67/02 |
| | | | | 726/4 |
| 2016/0088000 | A1 * | 3/2016 | Siva Kumar | H04L 63/1416 |
| | | | | 726/23 |
| 2019/0080081 | A1 * | 3/2019 | Goodridge | G06F 21/51 |
| 2020/0076806 | A1 * | 3/2020 | Nassar | H04L 63/0892 |
| 2021/0277300 | A1 | 9/2021 | Lombardo et al. | |
| 2022/0374535 | A1 * | 11/2022 | Jagasia | G06F 21/604 |
| 2023/0035189 | A1 * | 2/2023 | Mullin | H04L 63/105 |
| 2023/0063852 | A1 * | 3/2023 | Manepalli | H04L 63/0838 |

OTHER PUBLICATIONS

Samarkin, Y., Amao, A., Aljawad, M.S. et al. Hardness Enhancement of Carbonate Rocks by Formation of Smithsonite and Fluorite. Rock Mech Rock Eng 55, 1001-1012 (2022).

Enrico Sassoni, Sonia Naidu, George W. Scherer, The use of hydroxyapatite as a new inorganic consolidant for damaged carbonate stones, Journal of Cultural Heritage, vol. 12, Issue 4, 2011, pp. 346-355.

David Kwaku Danso, Berihun Mamo Negash, Tigabwa Y. Ahmed, Nurudeen Yekeen, Tarek Arbi Omar Ganat, Recent advances in multifunctional proppant technology and increased well output with micro and nano proppants, Journal of Petroleum Science and Engineering, vol. 196, 2021, 108026.

* cited by examiner

300

302 DISABLING A PRIVILEGED ACCOUNT FOR A USER OF A SYSTEM

304 RECEIVING A REQUEST FOR AN ELEVATED PRIVILEGE AT THE SYSTEM

306 AUTHENTICATING THE USER

308 ENABLING THE PRIVILEGED ACCOUNT FOR THE USER

310 CAUSING EXISTING RIGHTS FOR THE USER AT THE SYSTEM TO BE ELEVATED

SYSTEM AND METHOD FOR MANAGING PRIVILEGED ACCOUNT ACCESS

FIELD OF THE DISCLOSURE

This disclosure relates generally to access management, and more particularly, to managing privileged account access.

BACKGROUND OF THE DISCLOSURE

Access Management aims to grant authorized users the right to use a service while preventing access to non-authorized users. Access Management is sometimes also referred to as Rights Management or Identity Management (IdM). IdM addresses the need to ensure appropriate access to resources across increasingly heterogeneous technology environments and to meet increasingly rigorous compliance requirements. Identity and access management systems not only identify, authenticate, and control access for individuals who will be utilizing IT resources but also the hardware and applications employees need to access.

SUMMARY OF THE DISCLOSURE

Various details of the present disclosure are hereinafter summarized to provide a basic understanding. This summary is not an extensive overview of the disclosure and is neither intended to identify certain elements of the disclosure nor to delineate the scope thereof. Rather, the primary purpose of this summary is to present some concepts of the disclosure in a simplified form prior to the more detailed description that is presented hereinafter.

According to an embodiment consistent with the present disclosure, a method can include disabling a privileged account for a user to disable the user from performing an action at a system, receiving a request for at least one elevated right at the system corresponding to a request to be enabled to perform the action at the system, authenticating the user to confirm the identity of the user in response to receiving the request, enabling the privileged account for the user in response to authenticating the user, and causing existing rights for the user at the system to be elevated to allow the user to perform the action at the system in response to enabling the privileged account for the user.

In another embodiment, a system can include memory to store machine-readable instructions, and one or more processors to access the memory and execute the machine-readable instructions. The machine-readable instructions can include an account privilege manager programmed to receive a request for one or more elevated rights for a user at a given system, generate an authentication request to authenticate that the user has requested the one or more elevated rights at the given system. The authentication request can include one of a random number or a one-time password (OTP). The account privilege manager is further programmed to provide the authentication request to a mobile device of the user and receive user data inputted by the user at a user device. The user data can include the random number or the OTP that was communicated to the mobile device. The account privilege manager is further programmed to enable the one or more elevated rights for the user at the given system based at least one the user data.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
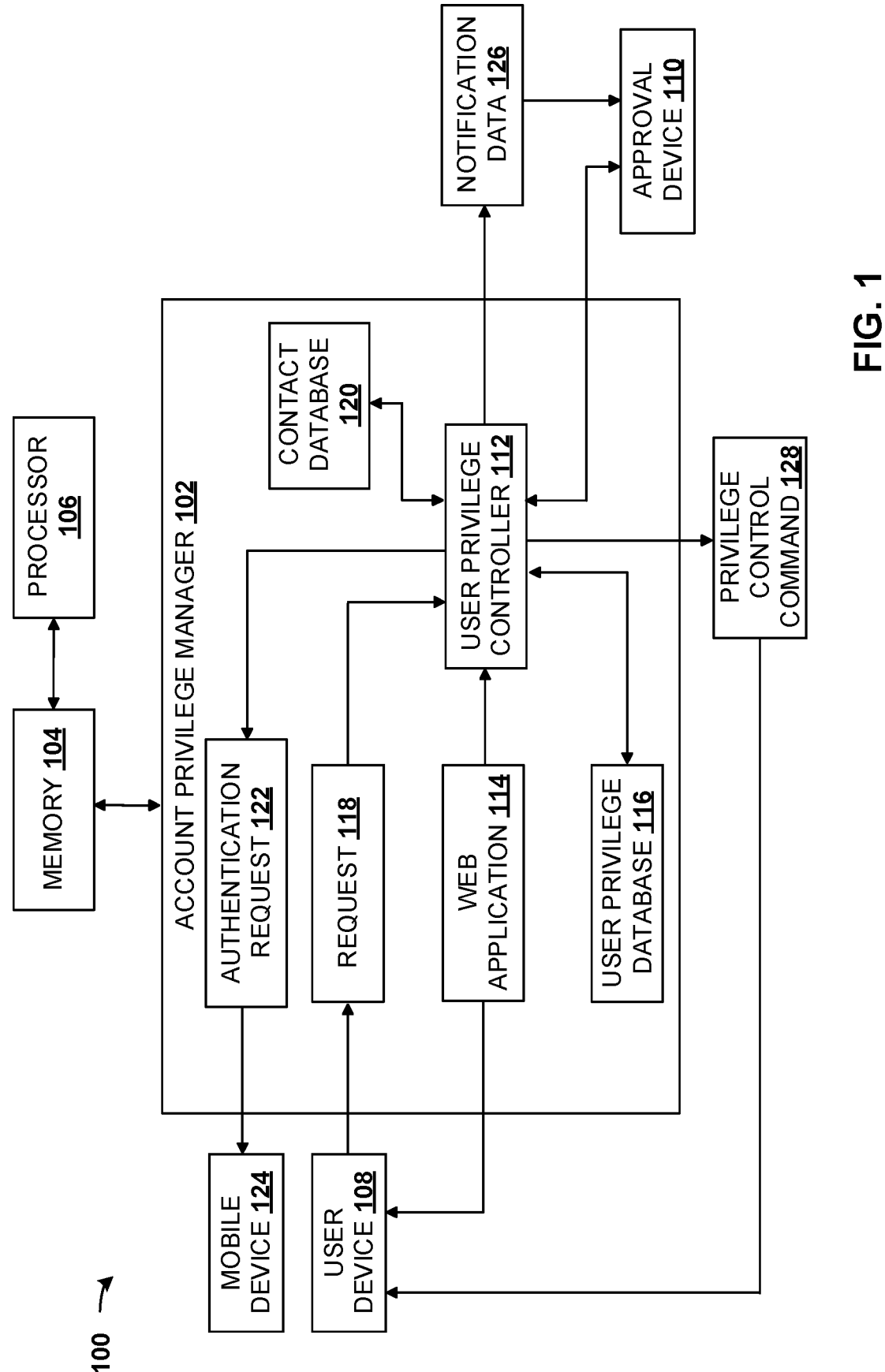
FIG. 1 is an example of a system for managing privileged account access.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to access management. Privileged accounts pose a greater cybersecurity risk to systems, as such accounts have elevated rights in contrast to non-privileged accounts, also known as normal accounts. The term "system" as used herein can encompass any device, network (e.g., a physical network, wireless network, and/or the like), and/or an application (e.g., a service executing on a server, a local processing application, etc.). Without proper controls, when such accounts are compromised, the systems and/or system data can become compromised, in some instances leading to a loss or leakage of data to unauthorized users. For example, administrative accounts, a type of privileged account, are generally used by IT personnel to troubleshoot, install, configure, delete objects, and/or the like. If an administrative account is compromised, an intruder (e.g., a hacker) can exploit the account to make unwanted security changes to the system (e.g., open a port that was previously closed).

According to the examples herein, a system and method are described that reduce a likelihood that a privileged account for a user is compromised, thereby improving overall security of a system. For example, an account privilege manager according to the examples herein can disable a privileged account for the user to disable the user from performing an action at a system (e.g., device, network, and/or application). The user can employ a user device or mobile device to provide a request to the account privilege manager for at least one elevated right at the system corresponding to a request to be enabled to perform the action at the system. The account privilege manager can authenticate the user to confirm the identity of the user in response to receiving the request. The account privilege manager can enable the privileged account for the user to enable the user to perform the action at the system in response to authenticating the user. The account privilege manager can provide a privilege control command, which can be received by the system and cause existing rights for the user at the system to be elevated to allow the user to perform the action at the system.

FIG. 1 is an example of a system 100 for managing privileged account access, for example, for an enterprise. Although examples herein are presented wherein privileged accounts are managed for an enterprise, such as a corporation, in other examples, the system 100 can be used to manage a privileged account for non-enterprise entities, for example, a consumer. For clarity and brevity, the discussion herein focuses on privileged accounts, such as an administrator account, but it should be understood that a broader definition is intended.

With respect to the example of FIG. 1, the system 100 includes an account privilege manager 102. In some examples, the account privilege manager 102 can be implemented using one or more modules, shown in block form in the drawings. The one or more modules can be in software or hardware form, or a combination thereof. In some examples the account privilege manager 102 can be implemented as machine readable instructions that can be stored in memory, such as a memory 104, as shown in FIG. 1. A processor 106 can access the memory 104 and execute the machine readable instructions to implement at least some of the functions, as described herein. By way of example, the memory 104 can be implemented, for example, as a non-transitory computer storage medium, such as volatile memory (e.g., random access memory (RAM), such as DRAM), non-volatile memory (e.g., a hard disk drive, a solid-state drive, a flash memory, or the like), or a combination thereof. The processor 106 can be implemented, for example, as a processor core.

The processor 106 can execute the machine readable instructions implementing the account privilege manager 102 to control a level of account access for a user, such as an administrator for the enterprise. The account privilege manager 102 can communicate with a user device 108 for the user. The user device 108 may be any type of computing device, such as a portable computing device (e.g., mobile phone, tablet, laptop computer, and/or the like), or stationary device (e.g., a desktop computer) that the user can access or use to request privilege rights. While examples are presented herein wherein the user employs the user device 108 to request elevated rights for the user device 108, in other examples, the request for the elevated rights can be for a different device, an application, or a network. An elevated right and its derivatives as used herein refers to an action that the user was not previously able to perform at a system. An example of an elevated right is installation of software on the user device 108. Additionally, the examples herein should not be construed and/or limited to only requesting and implementing elevated rights at a user device, such as the user device 108. The examples herein are equally applicable to systems, networks, and/or applications.

The user can employ the user device 108 to communicate with the account privilege manager 102 to request that a privileged account for the user is enabled, thereby providing the user with one or more elevated rights at the user device 108 or other user device. Initially, the privileged account that is defined or created for the user is disabled (e.g., not enabled). For example, a different user (e.g., a manager), referred to herein as an elevated user, can define or configure the privileged account for the user so that the user has a level of access above a normal user, which the user can use to view non-normal user information, make changes, updates, and/or the like at a device (e.g., any type of device that can support storage, such as computers, servers, personal digital assistants (PDAs), cellular telephones, tablets, smart phones, fax machines, printers, copiers, gaming consoles, application-specific devices), a network (e.g., corporate or enterprise network), an application (e.g., a mobile application, a server-side application, a device application, a database application, a system software application, a business application, a customer relationship management application, an enterprise resource planning application, a project management application, a business process management application, a custom developed application, a productivity application, a time management application, a resource management, a web browser application, a presentation application, a spreadsheet application, a graphics application, a word processor application, a multimedia application, an education, information application, a content access application, a shareware application, a simulation application, an open source application, and a closed source application), and/or the like.

For example, the privileged account can be created for the user and automatically disabled. The privileged account can be created by the elevated user using an approval device 110. The approval device 110 can be implemented similar to the user device 108, as discussed herein. In some instances, a different device is used to create the privileged account for the user, or the privileged account is created by a different user and/or in a different manner. The account privilege manager 102 can include a user privilege controller 112, which can retrieve or use a web application 114. The web application 114 can be stored in the memory 104, or in other examples, at a different memory location (e.g., on a remote server, or in a cloud computing environment). While the example of FIG. 1 illustrates the user privilege controller 112 providing the web application 114 to the approval device 110, in other examples, the web application 112 is provided by a different application or module. A web browser can be executed on the approval device 110 based on the web application 112 to provide the elevated user with a user interface, such as a privileged account definition screen.

The privileged account definition screen may request that the elevated user provide credentials (e.g., a username and password) before being permitted to create the privileged account for the user. The privileged account definition screen can be employed by the elevated user to create the privileged account for the user. For example, the elevated user can define one or more elevated rights for the user at the user device 108. In response to defining the one or more elevated rights for the privileged account for the user, the privileged account can include an account status parameter that can be set to disabled. In some instances, the elevated user can set the account status parameter, in other examples, the web application 114 or the user privilege controller 112 can set the account status parameter in response to the elevated user indicating that the one or more elevated rights of the privileged account for the user at the user device 108 have been defined for the user. In further examples, the one or more elevated rights of the privileged account can be determined automatically based on historical privileged account data defining other or similar privileged accounts for users with a similar level of authority or clearance at the enterprise.

In some instances, the privileged account definition screen can be used to set an amount time that the user can have one or more elevated rights at the user device 108. If no time is defined for the privileged account, the web application 114 can set a default time (e.g., four (4) hours). Regardless how the rights of the privileged account are set or defined for the user, the privileged account for the user can be stored in a user privilege database 116, as shown in FIG. 1. The user privilege database 116 can include any number of privileged accounts for one or more users (e.g., same or different users), wherein each privileged account therein includes the account status parameter that indicates whether a respective privileged account is enabled or disabled, the one or more elevated rights that the user has for a respective system (e.g., in the example of FIG. 1, the user device 108), an identity of the user (e.g., name, email, or a pseudo name), and/or a ticket number, and/or other relevant information as necessary.

In some examples, to request the one or more elevated rights at the user device 108, the user can use the user device 108 to communicate with the web application 114. While the example of FIG. 1 illustrates the web application 114 being provided directly to the user device 108, in other examples, a different application, module, or the user privilege controller 112 can provide the web application 114 to the user device 108. For example, a web browser can be executed on the user device 108 to communicate with the web application 114 to provide the user with a user interface on the user device 108, such as a privileged account request screen. The privileged account request screen can be employed by the user to submit a privilege request 118 for the one more elevated rights at the user device 108. The privilege request 118 may include a justification for the one or more elevated rights (e.g., to troubleshoot, install, configure or delete objects, etc.), a length of time for the one or more elevated rights, and an identity of the user. The privilege request 118 can be provided to the user privilege controller 112, as shown in FIG. 1. In some instances, the privilege request 118 is provided to the user privilege controller 112 by the web application 114.

In some examples, the user privilege controller 112 can communicate with a contacts database 120. The contacts database 120 can identify a number of users and store a number of telephone numbers for the users. In some instances, the users identified in the contacts database 120 can be associated with a corresponding privileged account that is stored in the user privilege database 116. In some instances, the contacts database 120 and the user privileged database 116 can be implemented as a single database.

The user privilege controller 112 can query, search, or request a telephone number from the contacts database 120 in response to the privilege request 118. For example, the identity of the user can be used to identify the mobile number for the user in the contacts database 120. The user privilege controller 112 can include a random number generator for generating a random number for use in authenticating the user of the user device 108. The user privilege controller 112 can generate an authentication request 122 that includes the random number. In some instances, the user privilege controller 112 generates a one-time password (OTP). The authentication request 120 that includes the random number or the OTP can be provided to a mobile device 124. In additional or alternative examples, the user privilege controller 112 can use a single-sign-on (SSO) to provide the OTP. The authentication request 122 can be provided as a short message service (SMS) message. The authentication request 122 can be received by the mobile device 124 of the user, such as a cellular phone. While examples are presented herein wherein the user device 108 and the mobile device 124 are different devices, in some examples, the user device 108 may be a mobile device, and the authentication request 122 can be received at the user device 108.

By way of further example, the web browser on the user device 108 can provide the user with an authentication confirmation screen in response to the web application 114. For example, the web application 114 can provide the authentication confirmation screen in response to the user privilege controller 112, for example, indicating that the authentication request 122 has been sent to the mobile device 124. The user can input the random number or the OTP that was received on the mobile device 124 in an authentication field of the authentication confirmation screen. The user device 108 can generate user data that includes the inputted random number or the OTP and provide the user data to the user privilege controller 112. The user privilege controller 112 can compare the inputted random number or the OTP from the user data to the OTP or the random number that was sent in the authentication request 112 to the mobile device 124. In response to a match, the user privilege controller 112 can output notification data 126. The notification data 126 can indicate that the privileged account for the user has been enabled, the identity of the user, and the amount of time that the privileged account has been enabled.

In some instances, the notification data 126 is provided to the approval device 110. For example, the notification 126 data can be provided to the approval device 110 as an SMS message. In additional or alternative examples, the notification data 126 can be provided to other enterprise devices of an identity and access management division and/or a security operations monitoring team to alert appropriate enterprise personnel that the privileged account has been enabled for the user.

In further examples, the user privilege controller 112 can output a privilege control command 128 identifying the one or more elevated rights of the privileged account that are to be enabled at the user device 108 corresponding to configuring the user of the user device 108 with the privilege account. The privilege control command data 128 can be generated by the user privilege controller 112 in response to the inputted random number or the OTP from the user data matching the OTP or the random number that was provided in the authentication request 112 to the mobile device 124.

The privilege control command 128 can be provided to the user device 108 to configure or enable the user to use the user device 108 with elevated privileges for the amount of time that the privileged account has been enabled. For example, a user account control (UAC) application executing on the mobile device 124 can receive the privilege control command 128 and enable the user to have the one or more elevated rights at the user device 108 corresponding to enabling the user to perform one or more actions that the user was previously not able to perform prior to be granted authority via the privilege control command 128.

In some examples, the elevated user of the approval device 110 may decide to revoke the one or more elevated rights (or a subset of elevated rights) enabled for the user at the user device 108 before the amount of time that the privileged account has been enabled expires. The web browser on the approval device 110 can provide the elevated user with a privilege revocation screen in response to the web application 114. The elevated user can use the privilege revocation screen to submit a privilege revocation request to the user privilege controller 112. The privilege controller 112 can provide the privilege control command 128 to indicate that the elevated rights for the user at the user device 108 are to be revoked or removed. The privilege control command 128 can be provided to the user device 108 to remove the elevated privileges that the user has been granted at the user device 108 corresponding to disabling the privileged account for the user at the user device 108. For example, the UAC application executing on the user device 108 can receive the privilege control command 128 indicating that the one or more elevated rights (or a subset of elevated rights) for the user at the user device 108 are to be revoked and de-elevate privileges of the user at the user device 108 corresponding to de-elevating the user at the user device 108 from the privileged account to a different privileged account or normal account that does not include the one or more elevated rights.

Accordingly, the account privilege manager 102 can be used to create the privileged account for the user at the user device 108 and disable the privileged account in response to being created or upon creation. The account privilege manager 102 can use a requesting and authentication schema, as described herein, to enable the privileged account for the user at the user device 108 only when the user needs such privileges. By using the account privilege manager 102, enterprises can reduce a cybersecurity risk to systems (e.g., devices, such as the user device 108, networks, and/or applications) used by IT personnel if credentials for such personnel are compromised. This is because the account privilege manager 102 disables the elevated rights of the privileged account in response to being created or upon creation, and requires that the user authenticate the user's identity before elevating the users privileges at the system according to the privileged account for the user. The account privilege manager 102 can be configured to manage a user's privileged account access over a number of IT devices, and enabling elevated rights at corresponding IT devices only when the user has requested such rights and the identity of the user has been authenticated, as described herein.

Figure 2:
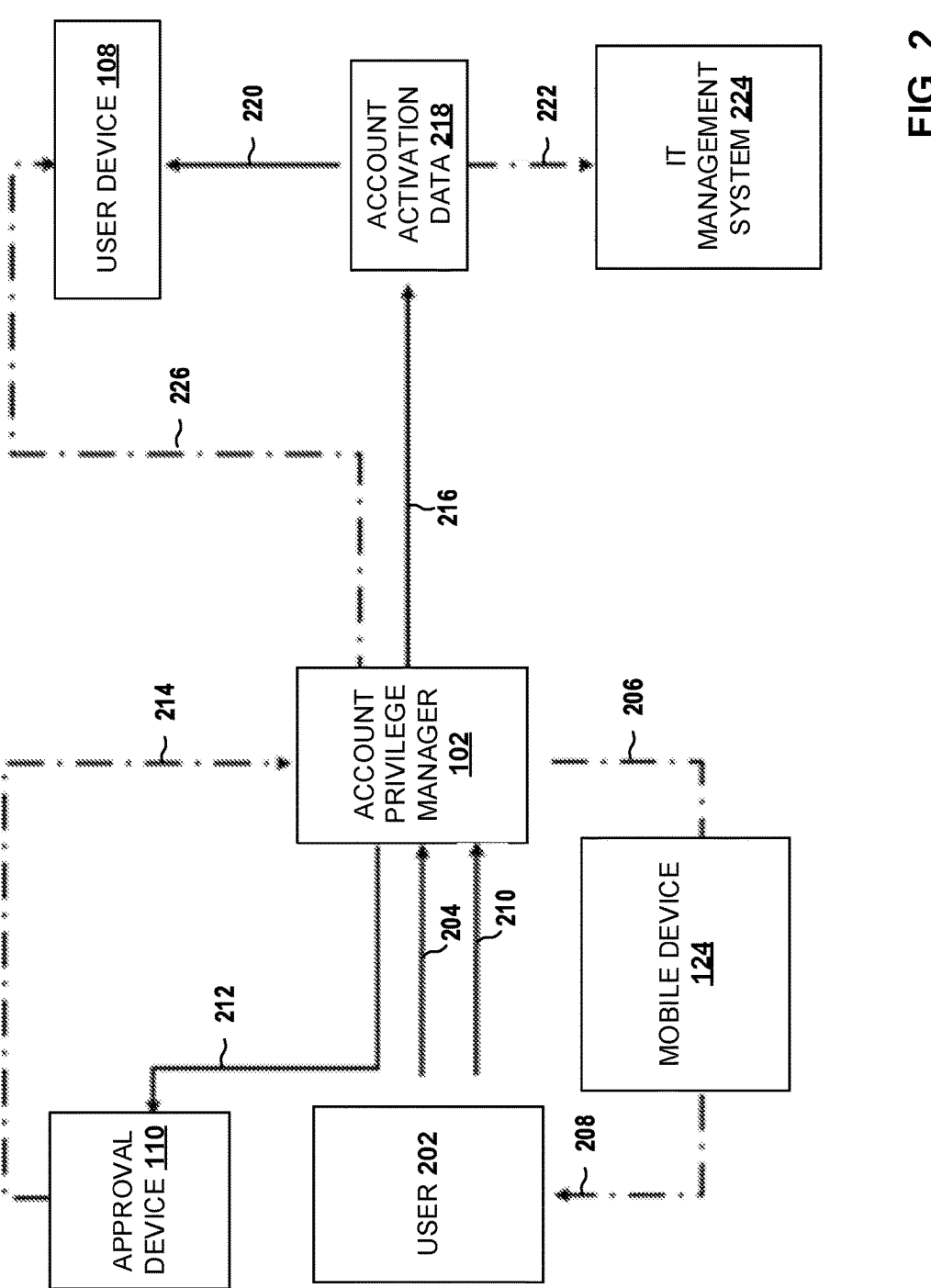
FIG. 2 is an example diagram for managing a privileged account for a user at a user device.

FIG. 2 is an example diagram 200 for managing a privileged account for a user at a user device, such as the user device 108, as shown in FIG. 1. Thus, reference can be made to the example of FIG. 1 in the example of FIG. 2. A user 202 can use the user device 108 to issue the privilege request 118, at 204 as shown in FIG. 2, to request one or more elevated rights at the user device 108, which can be provided to the account privilege manager 102. At 206, the account privilege manager 102 can issue the authentication request 122 in response to receiving privilege request 118. The authentication request 122 can be received at the mobile device 124 and includes a random number or an OTP that can be generated by the account privilege manager 102. At 208, the mobile device 124 can enable the user 202 to view the random number or the OTP, as shown in FIG. 2. The user 202 can input the number or the OTP at the user device 108, which is provided to the account privilege manager 102, at 210 as shown in FIG. 2.

In some instances, at 212 as shown in FIG. 2, the account privilege manager 102 can issue an approval request to the approval device 110. The approval request can be a request for the one or more elevated rights at the user device 108. The elevated user can provide approval data, as shown at 214 in FIG. 2, at the approval device 110, which can indicate that the request for the one or more elevated rights at the user device 108 for the user has been approved by the elevated user. At 216, the account privilege manager 102 can determine that the privileged account for the user of the user device 108 has been approved to provide account activation data 218 in response to determining that the random number or the OTP received from the user device 108 matches the random number or the OTP provided in the authentication request 122 to the mobile device 124, and the approval data. The account activation data 218 can correspond to the privilege control command 128 or the notification data 126.

In examples wherein the account activation data 218 is the privileged control command 128, as shown in FIG. 1, the privileged control command 128 can be provided to the user device 108, as shown at 220 in FIG. 2, to enable the one or more elevated rights at the user device 108. In examples wherein the account activation data 218 is the notification data 126, as shown in FIG. 1, the notification data 126 can be provided, as shown at 222, to an IT management system 224 for alerting IT personnel that the user has been granted the one or more elevated rights at the user device 108. In some examples, the elevated user of the approval device 110 may decide to revoke the one or more elevated rights (or a subset of elevated rights) enabled for the user at the user device 108. The approval device 110 can provide a privilege revocation request to the account privilege manager 102, which as shown at 226 in FIG. 2, issue a privilege control command for revoking the one or more elevated rights (or a subset of elevated rights) at the user device 108.

Figure 3:
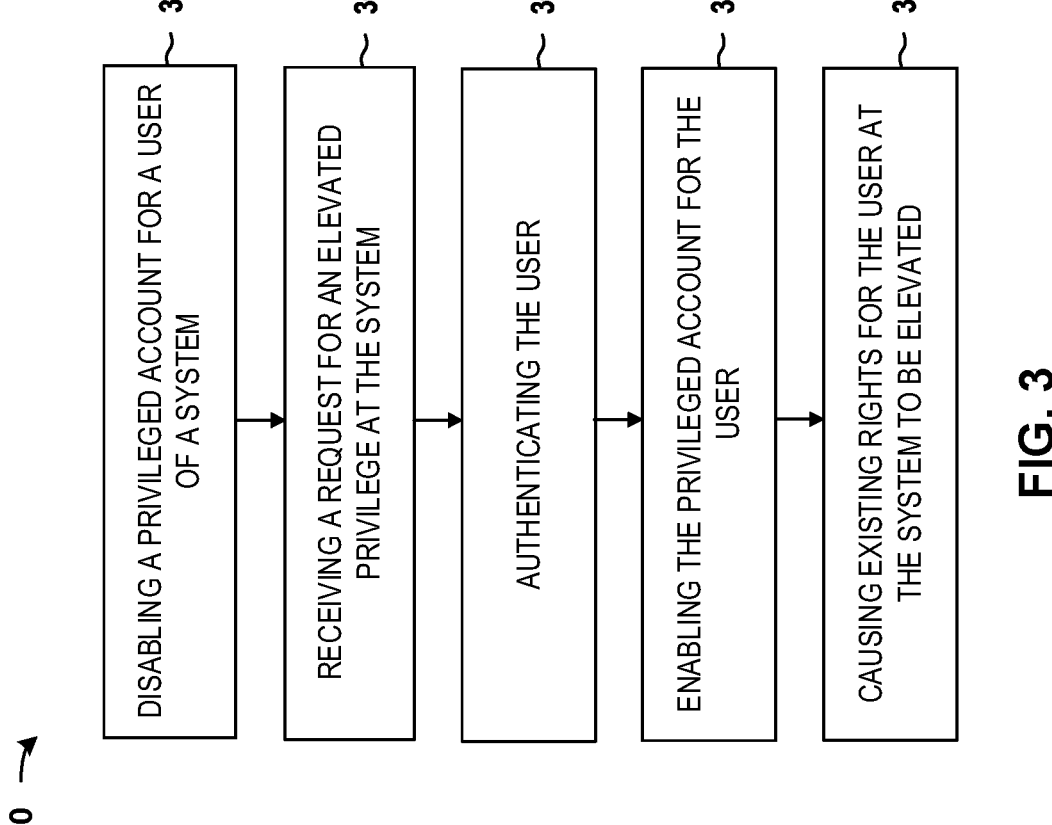
FIG. 3 is an example of a method for managing a privileged account for a user at a system.

In view of the foregoing structural and functional features described above, an example method will be better appreciated with reference to FIG. 3. While, for purposes of simplicity of explanation, the example method of FIG. 3 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the method.

FIG. 3 is an example of a method for managing a privileged account for a user at a system. The method 300 can be implemented by the user privilege controller 112, as shown in FIG. 1. Thus, reference can be made to the example of FIGS. 1-2 in the example of FIG. 3. In some examples, the system is a user device 108, as shown in FIGS. 1-2, and in other examples, the system is a network or application, for example, as described herein. The method 300 can begin at 302 by disabling, using an account privilege manager (e.g., the account privilege manager 102, as shown in FIG. 1 or FIG. 2) a privileged account for a user to disable the user from performing an action at the system. At 304, receiving, using the account privilege manager, a request (e.g., the privilege request 118, as shown in FIG. 1) for at least one elevated right at the system corresponding to a request to be enabled to perform the action at the system. At 306, authenticating, using the account privilege manager, the user to confirm an identity of the user in response to receiving the request. At 308, enabling, using the account privilege manager, the privileged account for the user at the system in response to authenticating the user. At 310, causing, using the account privilege manager, existing rights for the user at the system to be elevated to allow the user to perform the action at the system in response to enabling the privileged account for the user.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 4. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGI- TAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 4:
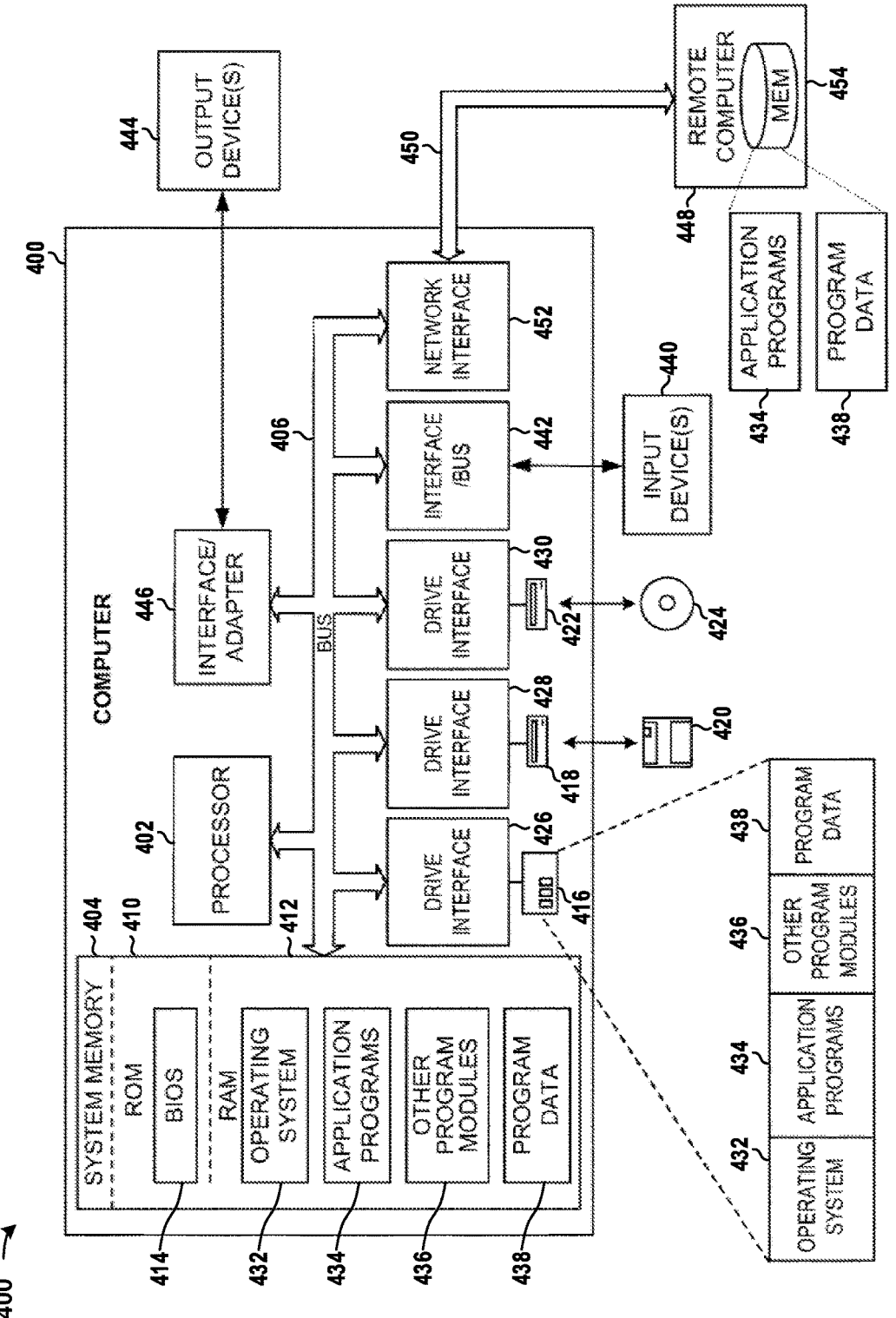
FIG. 4 depicts an example computing environment that can be used to perform methods according to an aspect of the present disclosure.

In this regard, FIG. 4 illustrates one example of a computer system 400 that can be employed to execute one or more embodiments of the present disclosure. Computer system 400 can be implemented on one or more general purpose networked computer systems, embedded computer systems, routers, switches, server devices, client devices, various intermediate devices/nodes or standalone computer systems. Additionally, computer system 400 can be implemented on various mobile clients such as, for example, a personal digital assistant (PDA), laptop computer, pager, and the like, provided it includes sufficient processing capabilities.

Computer system 400 includes processing unit 402, system memory 404, and system bus 406 that couples various system components, including the system memory 404, to processing unit 402. Dual microprocessors and other multiprocessor architectures also can be used as processing unit 402. System bus 406 may be any of several types of bus structure including a memory bus or memory controller, a peripheral bus, and a local bus using any of a variety of bus architectures. System memory 404 includes read only memory (ROM) 410 and random access memory (RAM) 412. A basic input/output system (BIOS) 414 can reside in ROM 410 containing the basic routines that help to transfer information among elements within computer system 400.

Computer system 400 can include a hard disk drive 416, magnetic disk drive 418, e.g., to read from or write to removable disk 420, and an optical disk drive 422, e.g., for reading CD-ROM disk 424 or to read from or write to other optical media. Hard disk drive 416, magnetic disk drive 418, and optical disk drive 422 are connected to system bus 406 by a hard disk drive interface 426, a magnetic disk drive interface 428, and an optical drive interface 430, respectively. The drives and associated computer-readable media provide nonvolatile storage of data, data structures, and computer-executable instructions for computer system 400. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 410, including operating system 432, one or more application programs 434, other program modules 436, and program data 438. In some examples, the application programs 434 can include the account privilege request manager 102 and the program data 438 can include the user privilege database 116 and/or the contact database 120, as shown in FIG. 1. The application programs 434 and program data 438 can include functions and methods programmed for managing privileged accounts for one or more users at a system, for example, the user device 108, such as shown and described herein.

A user may enter commands and information into computer system 400 through one or more input devices 440, such as a pointing device (e.g., a mouse, touch screen), keyboard, microphone, joystick, game pad, scanner, and the like. These and other input devices 440 are often connected to processing unit 402 through a corresponding port interface 442 that is coupled to the system bus, but may be connected by other interfaces, such as a parallel port, serial port, or universal serial bus (USB). One or more output devices 444 (e.g., display, a monitor, printer, projector, or other type of displaying device) is also connected to system bus 406 via interface 446, such as a video adapter.

Computer system 400 may operate in a networked environment using logical connections to one or more remote computers, such as remote computer 448. Remote computer 448 may be a workstation, computer system, router, peer device, or other common network node, and typically includes many or all the elements described relative to computer system 400. The logical connections, schematically indicated at 450, can include a local area network (LAN) and a wide area network (WAN). When used in a LAN networking environment, computer system 400 can be connected to the local network through a network interface or adapter 452. When used in a WAN networking environment, computer system 400 can include a modem, or can be connected to a communications server on the LAN. The modem, which may be internal or external, can be connected to system bus 406 via an appropriate port interface. In a networked environment, application programs 434 or program data 438 depicted relative to computer system 300, or portions thereof, may be stored in a remote memory storage device 454.

The invention claimed is:

1. A computer-implemented method comprising:
  disabling a privileged account for a user to disable the user from performing an action at a first and second system;
  receiving a request for at least one elevated right at the first system corresponding to a request to be enabled to perform the action at the first system;
  authenticating the user to confirm an identity of the user in response to receiving the request at a first device;
  enabling the privileged account for the user in response to authenticating the user;

causing existing rights for the user at the first system to be elevated to allow the user to perform the action at the first system in response to enabling the privileged account for the user, wherein the user is disabled from performing the action at the second system;
  generating notification data indicating that the privileged account for the user has been enabled at the first system;
  transmitting the notification data to a second device; and
  receiving second user data from the second device indicating the privileged account for the user is to be revoked to disable the user from performing the action at the first system, the second user data being generated at the second device based on the notification data.

2. The computer-implemented method of claim 1, further comprising creating the privileged account at the first system for the user, wherein the privileged account is disabled following creating the privileged account at the first system for the user.

3. The computer-implemented method of claim 2, wherein the authenticating comprises:
  identifying a telephone number for the user in response to the request;
  generating a random number or a one-time password (OTP) in response to identifying the telephone number for the user; and
  communicating the random number or the OTP to a mobile device of the user.

4. The computer-implemented method of claim 3, wherein the authenticating further comprises:
  receiving user data inputted by the user at a user device, the user data including the random number or the OTP that was communicated to the mobile device; and
  comparing the random number or the OTP that was communicated to the mobile device to the random number or the OTP of the user data inputted at the user device.

5. The computer-implemented method of claim 4, wherein the privileged account for the user is enabled in response to the comparison indicating that the random number or the OTP that was communicated to the mobile device matches the random number or the OTP of the user data inputted at the user device.

6. The computer-implemented method of claim 5, wherein the privileged account for the user at the user device is automatically revoked to disable the user from performing the action at the first system after a given amount of time.

7. The computer-implemented method of claim 5, further comprising communicating the notification data to an information technology (IT) management system.

8. The computer-implemented method of claim 7, further comprising:
  revoking the privileged account for the user in response to receiving the second user data; and
  causing the first system to disable the user from performing the action at the first system in response to revoking the privileged account.

9. The computer-implemented method of claim 8, wherein the first and second system are each one of a device, a network, or an application.

10. A system comprising:
  memory to store machine-readable instructions;
  one or more processors to access the memory and execute the machine-readable instructions, the machine-readable instructions configured to implement:

an account privilege manager programmed to:

create a privileged account for a user for a given system, wherein the privileged account is disabled following creating the privileged account;

receive a request for one or more elevated rights for a user at the given system;

generate an authentication request to authenticate that the user has requested the one or more elevated rights at the given system, the authentication request including one of a random number or a one-time password (OTP);

provide the authentication request to a mobile device of the user;

receive user data inputted by the user at a user device, the user data including the random number or the OTP that was communicated to the mobile device;

enable the one or more elevated rights for the user at the given system corresponding to enable the privileged account that was previously disabled based at least on the user data, wherein the user is disabled at another system;

receiving notification data indicating that the privileged account for the user has been enabled at the given system;

providing a command indicating the privileged account for the user is to be revoked to disable the user from performing the action at the first system, the command being generated based on the notification data.

11. The system of claim 10, wherein the account privilege manager is further programmed to:

generate a privilege control command identifying the one or more elevated rights that are to be enabled at the given system corresponding to configuring the user of the given system with a privileged account; and provide the privilege control command to the given system to cause the given system to enable the one or more elevated rights for the user.

12. The system of claim 11, wherein the one or more elevated rights for the user at the given system are elevated in response to a comparison indicating that the random number or the OTP that was communicated to the mobile device matches the random number or the OTP of the user data inputted at the user device.

13. The system of claim 11, wherein the user device is a first device, and the user data is first user data, and wherein the account privilege manager is further programmed to create the privileged account for the user of the given system based on second user input data received at a second user device that receives the notification data, wherein the privileged account identifies the one or more elevated rights, and is disabled automatically by the account privilege manger in response to being created based on the second user input data.

14. The system of claim 13, wherein the account privilege manager is further programmed to cause the one or more elevated rights of the user at the given system to be revoked in response to receiving third user data from the second user device, wherein the third user data indicates that the one or more elevated rights are to be removed for the user at the system.

15. The system of claim 10, wherein the received request includes a justification for the one or more elevated rights.

16. The system of claim 15, wherein the justification comprises one or more of installation, troubleshooting, and configuration or deletion of objections.

17. The computer-implemented method of claim 1, wherein the received request includes a justification for the one or more elevated rights.

18. The computer-implemented method of claim 17, wherein the justification is selected from one or more of installation, troubleshooting, and configuration or deletion of objections and is related to the one or more elevated privileges.

*    *    *    *    *